US012710887B2

(12) United States Patent
Hope et al.

(10) Patent No.: US 12,710,887 B2
(45) Date of Patent: Aug. 18, 2026

(54) PRIORITIZED THIN PROVISIONING WITH EVICTION OVERFLOW BETWEEN TIERS

(71) Applicant: Microsoft Technology Licensing, LLC, Redmond, WA (US)

(72) Inventors: Taylor Alan Hope, Redmond, WA (US); Vinod R. Shankar, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 4 days.

(21) Appl. No.: 18/726,291

(22) PCT Filed: Dec. 20, 2022

(86) PCT No.: PCT/US2022/082049
§ 371 (c)(1),
(2) Date: Jul. 2, 2024

(87) PCT Pub. No.: WO2023/133037
PCT Pub. Date: Jul. 13, 2023

(65) Prior Publication Data

US 2024/0411464 A1 Dec. 12, 2024

(30) Foreign Application Priority Data

Jan. 4, 2022 (LU) ........................................ 501202

(51) Int. Cl.
*G06F 3/06* (2006.01)

(52) U.S. Cl.
CPC .......... *G06F 3/0631* (2013.01); *G06F 3/0604* (2013.01); *G06F 3/0676* (2013.01); *G06F 3/0679* (2013.01)

(58) Field of Classification Search
CPC ........................................................ G06F 3/06
See application file for complete search history.

(56) References Cited

U.S. PATENT DOCUMENTS 8,245,272 B2 * 8/2012 Sasaki ................. G06F 11/3485 726/1
8,838,887 B1 9/2014 Chilton et al.
(Continued)

FOREIGN PATENT DOCUMENTS

EP 2518614 A1 10/2012
WO 2010099992 A1 9/2010

OTHER PUBLICATIONS

Search Report and Written Opinion Issued in Luxembourg Application No. LU501202, Aug. 11, 2022, 9 pages.
(Continued)

*Primary Examiner* — Khoa D Doan
(74) *Attorney, Agent, or Firm* — Workman Nydegger

(57) ABSTRACT

A computer system configured to thinly provision a plurality of logical volumes over a plurality of types of storage. The plurality of logical volumes includes (1) a first logical volume that is thinly provisioned over a first type of storage, and (2) a second logical volume that is thinly provisioned over a second type of storage. The status of the plurality of logical volumes is monitored to detect one or more events associated with at least one of the plurality of logical volumes. In response to detecting a particular event among the one or more events, a set of data stored in a portion of the first logical volume is selected. The selected set of data is copied to the second logical volume, and the portion of the first logical volume that stores the set of data is deallocated.

20 Claims, 10 Drawing Sheets

(56) References Cited

U.S. PATENT DOCUMENTS

| | | | | |
|---|---|---|---|---|
| 9,009,437 | B1 * | 4/2015 | Bjornsson | G06F 3/0641 718/1 |
| 9,870,366 | B1 * | 1/2018 | Duan | G06F 3/0653 |
| 10,599,354 | B1 * | 3/2020 | Greenwood | G06F 3/0613 |
| 2020/0133559 | A1 | 4/2020 | Auvenshine et al. | |
| 2021/0303169 | A1 * | 9/2021 | Tagar | G06F 3/0608 |
| 2023/0004312 | A1 * | 1/2023 | Hansen | G06F 3/0631 |

OTHER PUBLICATIONS

International Search Report and Written Opinion received for PCT Application No. PCT/US22/082049 Mar. 3, 2023, 16 pages.

* cited by examiner

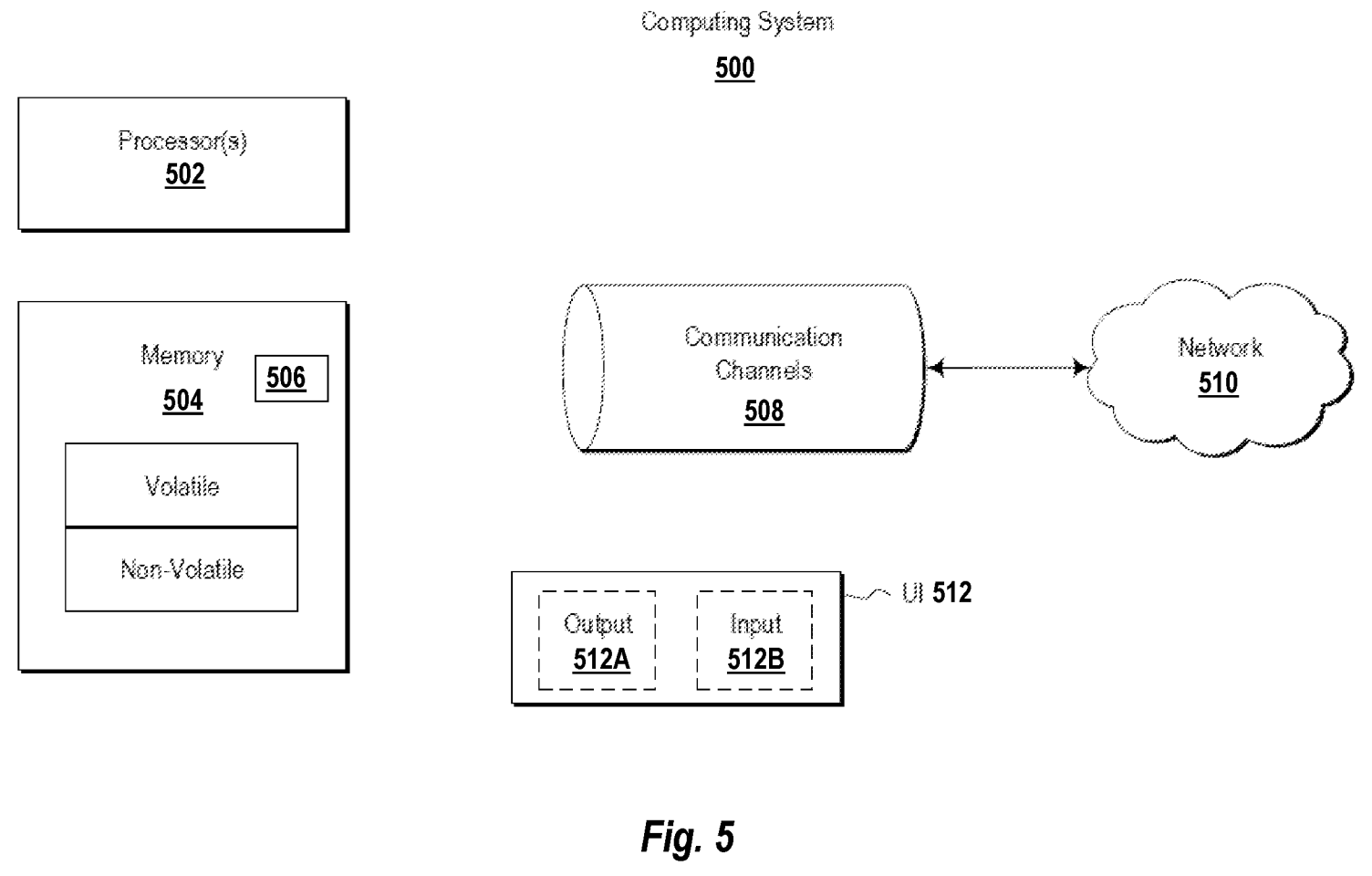

Computing System
500

Processor(s)
502

Memory
504

506

Volatile

Non-Volatile

Communication Channels
508

Network
510

UI 512

Output
512A

Input
512B

Fig. 5

PRIORITIZED THIN PROVISIONING WITH EVICTION OVERFLOW BETWEEN TIERS

CROSS-REFERENCE TO RELATED APPLICATIONS

The present application is a U.S. National Stage of International Application No. PCT/US2022/082049, filed on 20 Dec. 2022, designating the United States and claiming the priority of Luxembourg Patent Application No. LU501202 filed with the Luxembourg Intellectual Property Office on 4 Jan. 2022. All of the aforementioned applications are incorporated herein in their respective entirety by this reference.

BACKGROUND

Storage tiering provides the ability to move data to different regions of a volume made up with disks having different performance characteristics. Generally, higher-performance disks provide higher access speed, but cost more per unit. Tiered storage allows users and/or organizations to store different classes of data based on the minimum performances that they require and/or the lowest cost storage that can handle those requirements.

Storage provisioning is a process of logically grouping together one or more physical disks to form a volume. Depending on an entity's needs, a storage service may provision multiple volumes of storage over different types of storage for the entity for storage tiering. For example, the storage service may provision two logical volumes of storage. A first volume may be provisioned over a higher-tier storage, such as solid-state disks (SDDs), and a second volume may be provisioned over a lower-tiered storage, such as hard disk drives (HDDs). The first volume may be configured to perform higher-priority write operations, and the second volume may be configured to perform lower-priority write operations.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Storage provisioning is a process of logically grouping together one or more physical disks to form a volume. Depending on an entity's needs, a storage service may provision multiple volumes of storage over different types of storage for the entity for storage tiering. However, when a particular tiered volume is used up, the computer system is exposed to the possibility of a map failure during a data write operation. When a map failure occurs, the write operation may be forced to be aborted, and/or a user may be required to manually delete or move an amount of data from the particular tiered volume to allow the write operation. Alternatively, additional storage needs to be provisioned for the particular tiered volume to store additional data to the volume.

The current invention solves the above problem by monitoring status of different volumes and automatically moving data between different volumes. It is common that a particular tiered volume is used up, while another tiered volume is underused. As such, the invention provides a technical effect of allowing automatic moving data between different volumes, such that storage provisioned for entities are more efficiently utilized.

The embodiments described herein are related to a computer system configured to thinly provision a plurality of logical volumes over a plurality of types of storage. A total amount of each type of storage provisioned for the plurality of local volumes has a maximum capacity. The computer system is configured to monitor status of the plurality of logical volumes to detect one or more events associated with at least one of the plurality of logical volumes. In response to detecting a particular event among the one or more events, the computer system is configured to select a set of data stored in a portion of a first logical volume among the plurality of logical volumes, copy the set of data to a second logical volume among the plurality of logical volumes, and deallocate the portion of the first logical volume that stores the set of data.

In some embodiments, the first logical volume is thinly provisioned over a first type of storage, and the second logical volume is thinly provisioned over a second type storage. The first logical volume has a first maximum capacity, and the second logical volume has a second maximum capacity. Such embodiments provide a technical effect of efficiently and dynamically providing different types of storage to entities.

In some embodiments, each of the first logical volume and the second logical volume is thinly provisioned and tiered over the plurality of types of storage. The computer system is further configured to detect a second particular event among the one or more events. In response to detecting the second particular event, the computer system is configured to select a portion of the second logical volume that is thinly provisioned over a particular type of storage, deallocate the portion of the particular type of storage in the second logical volume, and allocate an additional portion of the particular type of storage to the first logical volume. Such embodiments provide a technical effect of dynamically providing tiered storage service to users and/or entities.

In some embodiments, the first type of storage is tier-one storage that has a first access speed, and the second type of storage is tier-two storage that has a second access speed that is slower than the first speed. In addition, the first logical volume may be configured to handle write operations having a first priority, and the second logical volume may be configured to handle write operations having a second priority that is lower than the first priority. For example, in some embodiments, the first logical volume is configured to store cached data, and the second logical volume is configured to store user data. Such embodiments provide a technical effect of dynamically providing multiple logical volumes for servicing different types of write operations based on priorities.

The principles described herein are also related to a method implemented at a storage service. The method includes thinly provisioning a plurality of logical volumes over a plurality of types of storage. The plurality of logical volumes includes (1) a first logical volume that is thinly provisioned over a first type of storage, and (2) a second logical volume that is thinly provisioned over a second type of storage. The first logical volume has a first maximum capacity, and the second logical volume has a second maximum capacity. The method further includes monitoring status of the plurality of logical volumes to detect one or more events associated with at least one of the plurality of logical volumes. In response to detecting a particular event among the one or more events, a set of data stored in a portion of the first logical volume is selected. The selected set of data is copied to the second logical volume, and the portion of the first logical volume that stores the set of data is deallocated.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which:

FIG. 5 illustrates an example computer system in which the principles described herein may be employed.

DETAILED DESCRIPTION

Figure 1:
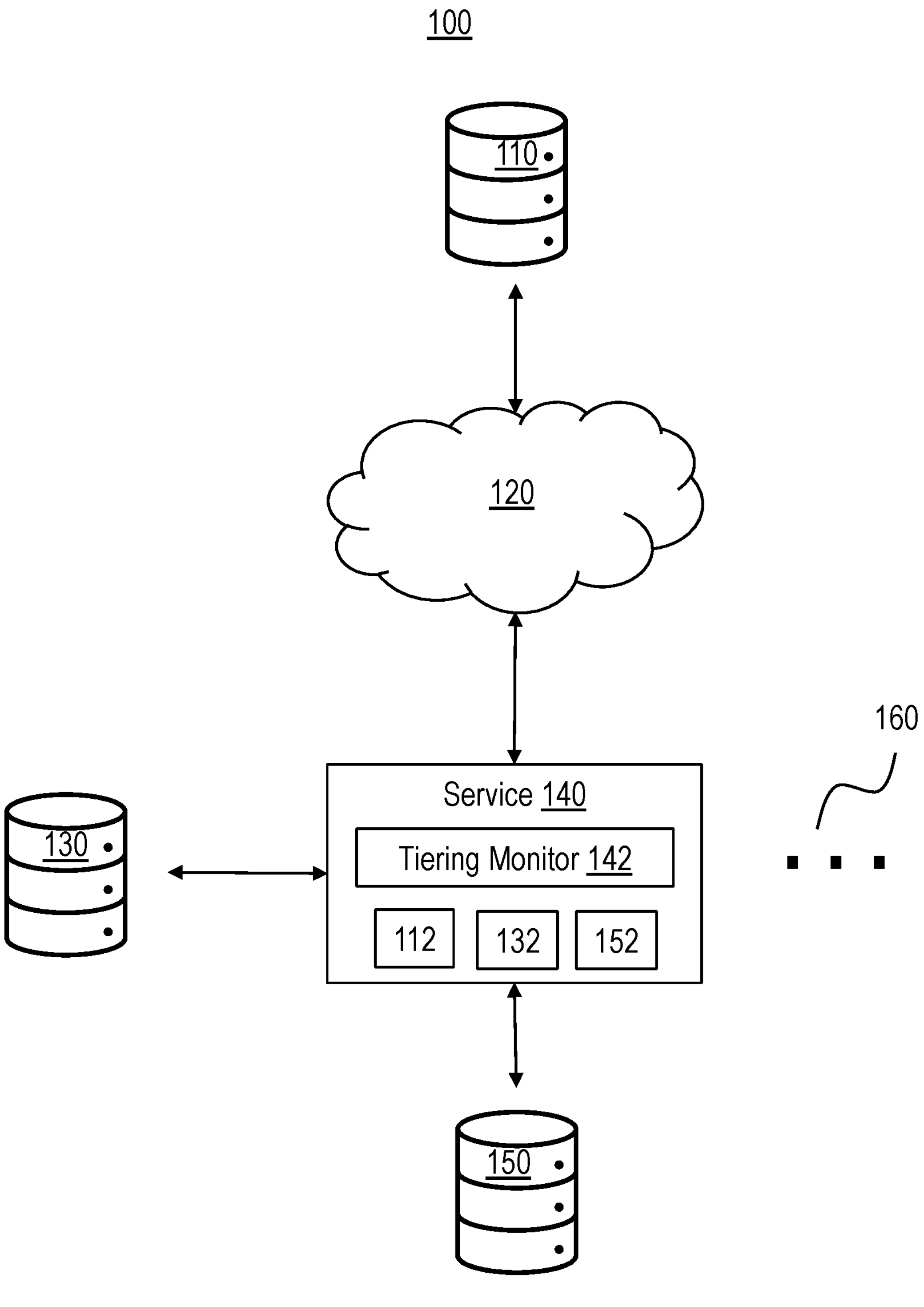
FIG. 1 illustrates an example environment in which a service computer system is configured to provision a plurality of logical volumes of storage over a plurality of different types of storage.

Principles described herein are related to prioritized thin provisioning with eviction overflow between different tiers of thinly provisioned volumes. Storage tiering provides the ability to move data to different regions of a volume made up with disks having different performance characteristics. Generally, higher-performance disks provide higher access speed, but cost more per unit. Tiered storage allows users and/or organizations to store different classes of data based on the minimum performances that they require and/or the lowest cost storage that can handle those requirements. It is often that generally a system has more lower performance disks than higher performance disks (either as a consequence of the hardware deployment or the provisioning to the user as a consequence of what they have paid for) and so as well as cost and/or availability.

However, in an existing storage service, when a particular tiered volume is used up, the computer system is exposed to the possibility of a map failure during a data write operation. When a map failure occurs, the write operation may be forced to be aborted, and/or a user may be required to manually delete or move an amount of data from the particular tiered volume to allow the write operation. Alternatively, the user may be required to pay for additional storage for the particular tiered volume to store additional data to the volume.

The current invention solves the above problem by monitoring status of different volumes and automatically moving data between different volumes. It is common that a particular tiered volume is used up, while another tiered volume is underused. As such, allowing automatic moving data between different volumes provide the technical effect of more efficiently utilizing storage capacities that has already been provisioned for entities.

In embodiments, a plurality of logical volumes are thinly provisioned over a plurality of types of storage. In some embodiments, the plurality of logical volumes includes (1) a first logical volume that is thinly provisioned over a first type of storage, and (2) a second logical volume that is thinly provisioned over a second type of storage. The first logical volume has a first maximum capacity, and the second logical volume has a second maximum capacity. The status of the plurality of logical volumes is monitored to detect one or more events associated with at least one of the plurality of logical volumes. In response to detecting a particular event among the one or more events, a set of data stored in a portion of the first logical volume is selected. The selected set of data is copied to the second logical volume, and the portion of the first logical volume that stores the set of data is deallocated. In some embodiments, the first type of storage is tier-one storage that has a first access speed, and the second type of storage is tier-two storage that has a second access speed that is slower than the first speed. For example, in some embodiments, the tier-one storage is SSD, and the tier-two storage is HDD.

In some embodiments, a plurality of logical volumes includes a first logical volume and a second logical volume, each of which is thinly provisioned and tiered over a plurality of types of storage. Such an embodiment provides a technical effect of dynamically providing tiered storage service to users and/or entities. A total amount of each type of storage provisioned for the plurality of logical volumes has a maximum capacity. For example, each of the first logical volume and the second logical volume is tiered over a first type of storage and a second type of storage, as such a total amount of the first type of storage provisioned for the first logical volume and the second logical volume has a first maximum amount, and a total amount of the second type of storage provisioned for the first logical volume and the second logical volume has a second maximum amount.

In some embodiments, the first logical volume is configured to handle write operations having a first priority, and the second logical volume is configured to handle write operations having a second priority that is lower than the first priority. Such an embodiment provides a technical effect of dynamically providing multiple logical volumes for servicing different types of write operations based on priorities. In addition, the first logical volume may be configured to store cached data, and the second logical volume may be configured to store user data. In response to detecting a particular event associated with a portion of the first logical volume provisioned over a particular type of storage (e.g., the portion provisioned over tier-one storage is sufficiently full), a portion of the second logical volume provisioned over the particular type of storage (e.g., the portion provisioned over tier-one storage) is deallocated, and an additional portion of the particular type of storage (e.g., tier-one storage) is allocated for the first logical volume.

Storage provisioning is a process of assigning storage resources to hosts based on the capacity, availability, and performance requirements of applications running on the hosts. For example, when an entity subscribes to a storage service, a type of disk and an amount of disk space are provisioned for the entity based on the entity's needs. Thin provisioning is a type of storage provisioning that allows the host computer system to allocate only a portion of the amount of disk space required for the virtual machine. For example, in some embodiments, thin provisioning allows the host computer system to allocate only the space the virtual disk is actually using.

Storage tiering is a technique of establishing a hierarchy of different storage types (also referred to as tiers). This enables storing a particular type of data to a particular tier based on service level requirements at a lower cost. In some embodiments, each tier has a different connection, protection, performance, and/or cost. For example, higher-performance but higher-cost solid-state drives (SSDs) can be configured as tier-one storage to keep frequently accessed data, and lower-performance but lower-cost hard disk drives (HDDs) can be configured as tier-two storage to keep the less frequently accessed data. As another example, local storage can be configured as tier-one storage, and remote storage can be configured as tier-two storage. Generally, keeping frequently used data in higher-performance drives improves application performance. Moving less frequently accessed data to lower-performance drives can free up storage capacity in high-performance drives and reduce the cost of storage.

The principles described herein are related to thinly provisioning a plurality of volumes over a plurality of different tiered storage, and moving data among the plurality of volumes dynamically and automatically.

FIG. 1 illustrates an example environment 100 in which a service computer system 140 implements the principles described herein. The service computer system 140 is configured to thinly provision a plurality of logical volumes 112, 132, 152 of storage over a plurality of different types of storage 110, 130, 150. In some embodiments, some of the logical volumes (e.g., logical volumes 132, 152) are thinly provisioned over local storage (e.g., storage 130, 150), and some of the logical volumes (e.g., logical volume 112) are thinly provisioned over remote storage (e.g., storage 110) configured to communicate with the service computer system 140 over a network (e.g., network 120).

Thin provisioning is a type of storage provisioning that uses virtualization technology to give the appearance of having more physical resources than are actually available. Thin provisioning enables creating and presenting a logical volume with more capacity than is physically allocated to it on the storage array. A thinly provisioned logical volume does not require physical storage to be completely allocated to it at the time it is created and presented to a host. Physical storage is allocated to the host "on-demand" from a shared pool of physical capacity. The shared pool of physical capacity generally includes a plurality of physical disks. The shared pool can be homogeneous (containing a single drive type), or heterogeneous (containing mixed drive types, such as, but not limited to, HDDs and SSDs. Thin provisioning not only enables more efficient allocation of storage to hosts, but also oversubscription, where more capacity is presented to the hosts than is actually available on the storage array. Both the shared pool and thinly provisioned volumes can be expanded non-disruptively as the storage requirements of the hosts grow. In some embodiments, multiple shared pools can be created within a storage array, and a shared pool may be shared by multiple thinly provisioned volumes.

In some embodiments, when an account is set up for an entity, an entity can often specify the type of resources and the amount of resources needed, and the service computer system 140 is configured to thinly provision the specified type and/or amount of storage for the entity. For example, as illustrated in FIG. 1, the multiple logical volumes include a first logical volume 112, a second volume 132, and a third volume 152. The first logical volume 112 is thinly provisioned over remote storage 110 (accessible via a network 120), the second volume 132 is thinly provisioned over local storage 130, and the third volume 152 is thinly provisioned over local storage 150. The ellipsis 160 represents that there may be additional logical volumes that are provisioned over same or different types of storage.

The different types of storage are often classified into different tiers based on their performance and/or access speed. In some embodiments, tier-one storage has a first access speed, tier-two storage has a second access speed that is slower than the first speed, tier-three storage has a third access speed that is slower than the second speed, and so on. In some embodiments, the plurality of types (or tiers) of storage includes at least (1) a local disk that is accessible locally, and (2) a remote disk that is accessible via a network. In some embodiments, the plurality of types (or tiers) of storage includes at least two of (1) a HDD, (2) a lower speed SDD, (3) a higher speed SSD, and (4) an ultra disk.

In some embodiments, the logical volume that is provisioned over the tier-one storage is configured to handle write operations having a first priority, and a logical volume that is provisioned over the tier-two storage is configured to handle write operations with a second priority that is lower than the first priority. For example, in some embodiments, the first tier logical volume (that is provisioned over tier-one storage) is configured to store cached data, and the second tier logical volume (that is provisioned over tier-two storage) is configured to store user data.

Traditionally, a user (e.g., a system administrator) can monitor the storage workloads periodically and move the data between the tiers. However, such manual storage tiering is complex and time-consuming. Further, it is common that higher-tier volume is used up, while a lower-tiered volume is underused. The principles described herein solve the above-described problem by providing an automated storage tiering solution, in which data movement between different tiers is performed automatically and dynamically.

In some embodiments, a tiering monitor 142 is implemented at the service computer system 140 configured to monitor a status of each of the plurality of volumes 112, 132, 152 to detect one or more events associated with at least one of the plurality of logical volumes. In response to detecting a particular event among the one or more events associated with a particular logical volume 112, 132, or 152, a set of data stored in a portion of the particular logical volume is selected; the selected set of data is copied to another logical volume, and the portion of the particular volume can then be deallocated (also referred to as "demapped").

Generally, a file system maintains a pointer map to the directories, subdirectories, and files that are part of the file system. Files are created and managed by users and/or applications and reside in the file system. The file system is mapped to file system blocks, and the file system blocks are mapped to logical extents of a logical volume, which are in turn mapped to disk physical extents either by the operating system or by a logical volume manager. These physical extents are, in turn, mapped to disc sectors in a storage subsystem. When the portion of the particular logical volume is deallocated, the portion of the storage is demapped from the file system.

The same principles described above are also applicable to virtual machines. In some embodiments, rather than provision actual hardware for an account associated with the entity, the service computer system 140 implements a hypervisor between the physical computer system hardware and the operating system environments. The hypervisor is configured to create an environment for each virtual machine. Each virtual machine contains its own virtual CPU, memory, storage disk, network interface card, etc. For example, in some embodiments, the service computer system 140 is configured to create a virtual machine that meets the requirements of each entity. The service computer system 140 can then use load balancing and high availability to ensure that the service meets the required access needs. As the entity's needs grow, the virtual machine's storage space and processing power can be scaled to meet the new requirements.

Figure 2:
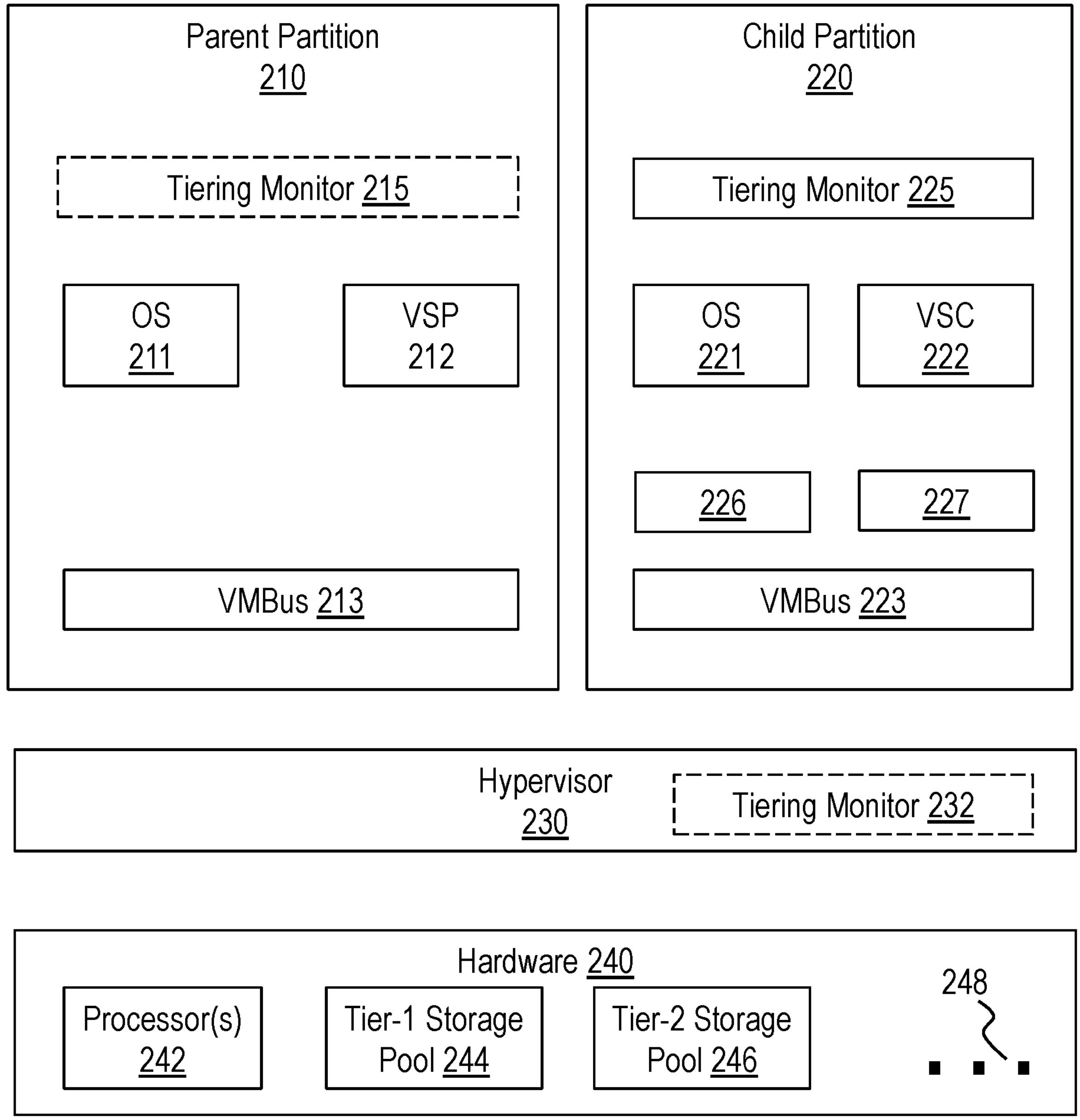
FIG. 2 illustrates an example architecture of a computer system that implements a hypervisor and one or more partitions running virtual machines (VMs), where a plurality of logical volumes are provisioned over a plurality of different tiered storage for a VM.

FIG. 2 illustrates an example architecture of computer system 200 (which corresponds to the computer system 140) that has a hypervisor 230 implemented thereon. The hypervisor 230 sits between physical hardware 240 and operating system environments. As illustrated in FIG. 2, the physical hardware 240 of the computer system 200 includes one or more processors 242 and a plurality of different tiered storage pools, including (but not limited to) a pool of tier-one storage 244 and a pool of tier-two storage 246. The ellipsis 248 represents that there may be additional hardware devices and/or additional tiered storage pools in the computer system 200.

As shown in FIG. 2, the operating system environments of the computer system 200 include a plurality of partitions, such as a parent partition 210 and one or more child partition(s) 220. The parent partition 210 is configured to run a parent operating system 211. The parent partition 210 is also configured to run a virtualization service provider VSP 212. The VSP 212 has direct access to the physical hardware 240. In some embodiments, the parent partition 210 is configured to create child partition(s) 220, each of which hosts a child guest operating system 221. In some embodiments, the parent partition 210 creates a child partition 220 using a hypercall application programming interface (API), which is an API exposed by the hypervisor 230.

The VSP 212 at the parent partition 210 is configured to connect VMBus 213 of the parent partition 210 and VMBus 223 of the child partition 220 to handle device access requests from the child partition 220. The child partition 220 internally runs a virtualization service client (VSC) 222. The VSC 222 is configured to redirect the request from the child partition 220 to the VSP 212 in the parent partition 210 via the VMBus 213, 223.

Notably, the child partition 220 does not have direct access to the physical processors, nor does it handle its real interrupts. Instead, it has a virtual view of the processor(s) 242 and runs within a guest virtual address space, which, depending on the configuration of the hypervisor 230, might not necessarily be the entire virtual address space. Depending on the configuration of the computer system 200, the hypervisor 230 may expose only a subset of the processors 242 to each partition. The hypervisor 230 handles the interrupts to the processors 242, and redirects them to the respective partition 220 using a logical controller.

Additionally, the child partition 220 also does not have direct access to hardware resources, such as storage disks in the pool of tier-one storage 244 or the pool of tier-one storage 246. Instead, the child partition 220 has a virtual view of the resources, in terms of virtual devices. Any request to the virtual devices is redirected via the VMBus 213, 223 to the devices in the parent partition 210. The VMBus 213, 223 is a logical channel that enables inter-partition communication. The response from the parent partition 210 to the child partition 220 is also redirected via the VMBus 213, 223.

Here, in a virtual environment, storage provisioning is a process of assigning storage resources to VMs based on the capacity, availability, and performance requirements of applications running on the VMs. For example, when the child partition 220 is created, a type of virtual disk and an amount of disk space are provisioned for the child partition 220. As illustrated in FIG. 2, the child partition 220 has access to a first logical volume 226 provisioned over tier-one storage 244 and a second logical volume 227 provisioned over tier-two storage 246.

Similar to the service computer system 140, the computer system 200 also implements a tiering monitor 225 configured to monitor a status of each of the plurality of volumes to detect one or more events associated with at least one of the plurality of logical volumes. In some embodiments, a tiering monitor 225 is implemented at each child partition 220 configured to monitor a status of the volumes provisioned for the particular VM running at the corresponding child partition 220. In some embodiments, the tiering monitor 215, 232 is implemented at the parent partition 210 and/or the hypervisor 230 configured to monitor statuses of volumes provisioned for multiple or all the VMs. In response to detecting a particular event among the one or more events, a set of data stored in a portion of the first logical volume 226 is selected; the selected set of data is copied to the second logical volume 227, and the portion of the first logical volume 226 can then be deallocated or demapped.

Figure 3A:
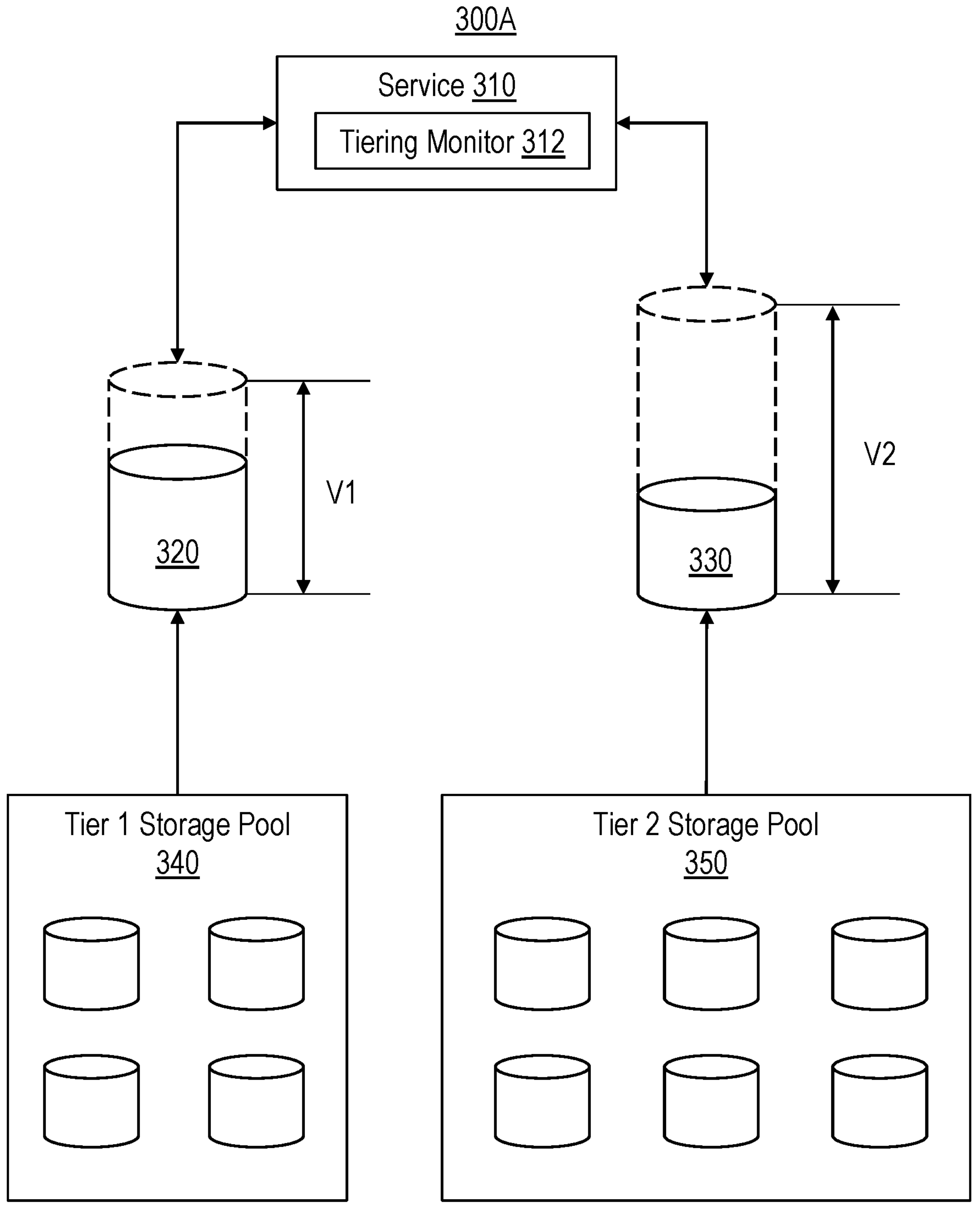
FIGS. 3A-3E illustrate an example process of dynamically moving data between different volumes.

FIGS. 3A-3E further illustrate an example process of dynamically moving data between different volumes. FIG. 3A is a schematic diagram 300A illustrating a service computer system 310 (which corresponds to the service computer system 140 of FIGS. 1 and/or 200 of FIG. 2) having a plurality of logical volumes of storage thinly provisioned therefor. The plurality of logical volumes includes a first logical volume 320 and a second logical volume 330. The first logical volume 320 is thinly provisioned over tier-one storage pool 340 (which may correspond to the pool of tier-one storage 244 of FIG. 2). The second logical volume 330 is thinly provisioned over a tier-two storage pool 350 (which may correspond to the pool of tier-one storage 246 of FIG. 2). The first logical volume 320 has a first maximum capacity V1, and the second logical volume 330 has a second maximum capacity V2. However, since each of the first logical volume 320 and the second logical volume 330 is thinly provisioned, only a portion of the maximum capacity V1 or V2 is allocated to the logical volume 320 or 330.

Further, the service computer system 310 includes a tiering monitor 312 (which corresponds to the tiering monitor 142 of FIGS. 1 and/or 215, 225, and/or 232 of FIG. 2).

The tiering monitor 312 is configured to monitor a status of each of the first logical volume 320 and the second logical volume 330. in response to detecting a particular event associated with the first logical volume 320 or the second logical volume 330, a set of data stored in a portion of the first logical volume 320 is selected and copied to the second logical volume 330.

Figure 3B:
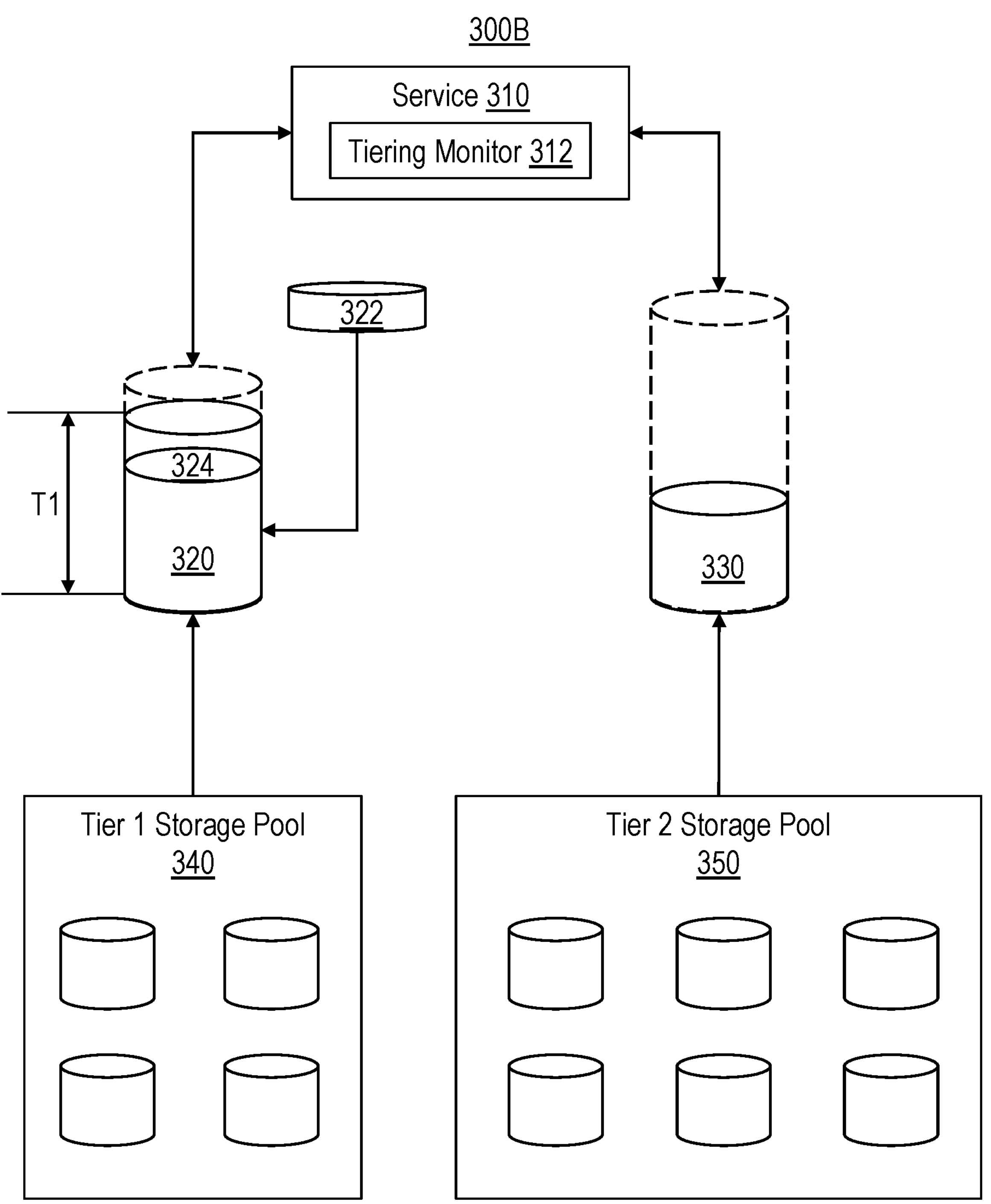

In some embodiments, the particular event is associated with a write operation that writes a set of data to the first logical volume 320 or the second logical volume 330. FIG. 3B is a schematic diagram 300B illustrating that a write operation associated with the first logical volume 320 is performed. The write operation causes a set of data 322 to be written into the first logical volume 320. In some embodiments, because the first logical volume 320 is thinly provisioned when a write operation is requested to be performed, an additional portion of storage 324 is allocated to the first volume just-in-time, and the additional portion of storage 324 is then used for storing the set of data 322.

The tiering monitor 312 is configured to monitor the status of the first logical volume 320. In some embodiments, in response to the write operation (and/or the request for the write operation), the tiering monitor 312 is configured to determine whether a total amount of storage that is provisioned (and/or is to be provisioned) for the first logical volume 320 has reached a predetermined threshold (also referred to a first threshold T1). When the total amount of storage that has been provisioned for the first logical volume 320 is greater than the first threshold T1, the tiering monitor 312 determines that the particular event occurs.

In some embodiments, the first threshold T1 is associated with the first maximum capacity V1 of the first volume 320. In some embodiments, the first threshold T1 is set to leave at least a minimum amount of free storage in the first logical volume 320, preventing a map failure from occurring. For example, assuming that the first maximum capacity is one terabyte, and the minimum amount of free storage is 50 gigabytes, the predetermined threshold is 950 gigabytes. In such a case, when the total amount of storage that has been provisioned for the first logical volume reaches 950 gigabytes, the tiering monitor 312 determines that an event occurs.

In some embodiments, the first threshold T1 is set to leave at least a minimum percentage of free storage in the first logical volume 320. For example, assuming the first maximum capacity V1 is one terabyte, and the minimum amount of free storage is 10%, the predetermined threshold is 900 gigabytes. In such a case, when the total amount of storage that has been provisioned for the first logical volume 320 reaches nine hundred gigabytes, the tiering monitor determines that an event occurs.

In some embodiments, the particular event is a map failure, indicating that there is not enough storage for a write operation in the first logical volume 320. For example, when a write operation for writing in the first logical volume 320 is requested, while there is not enough storage in the first logical volume 320 to perform the write operation, a map failure occurs. In some embodiments, in response to the map failure, the tiering monitor 312 determines that an event occurs.

Figure 3C:
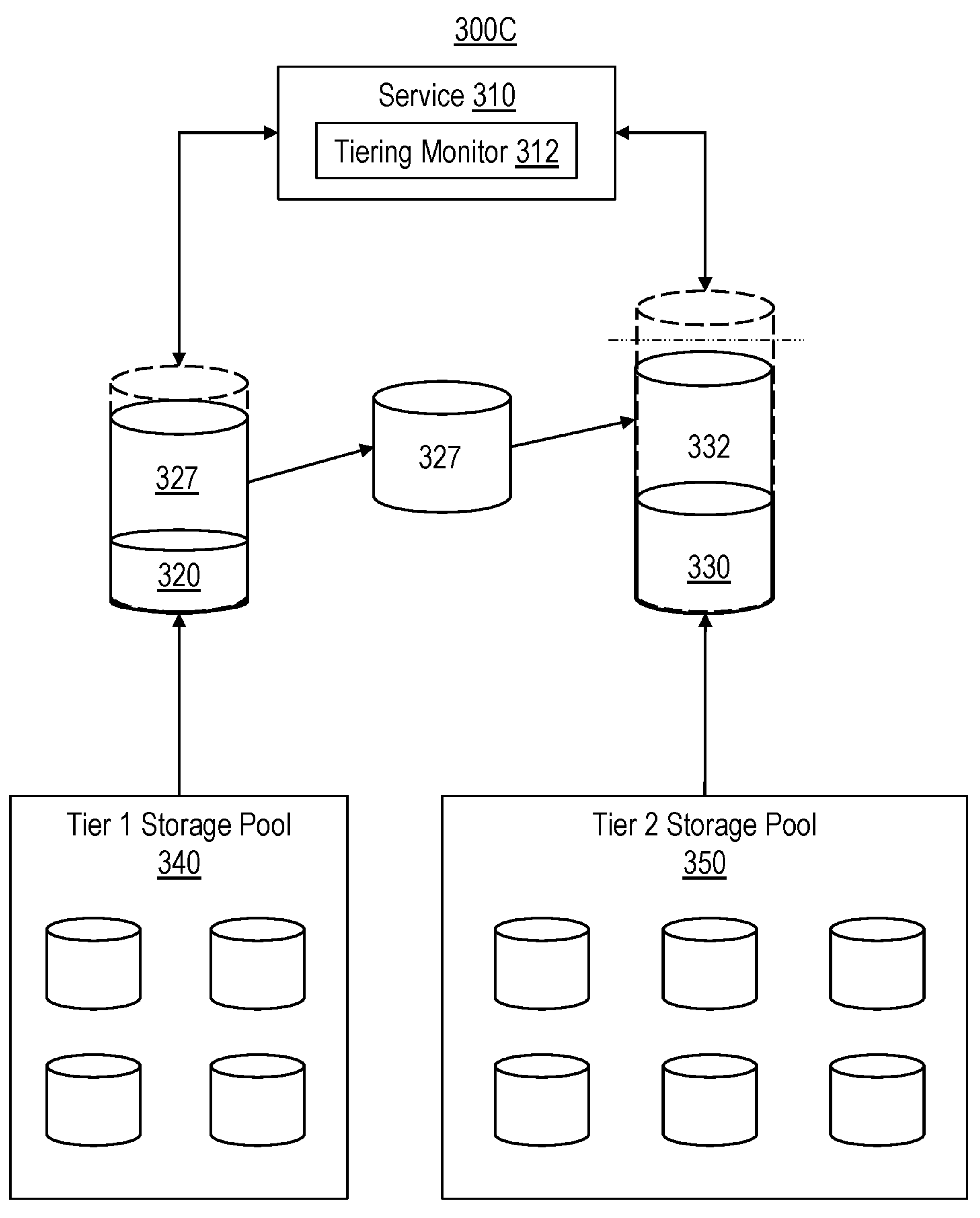
Figure 3D:
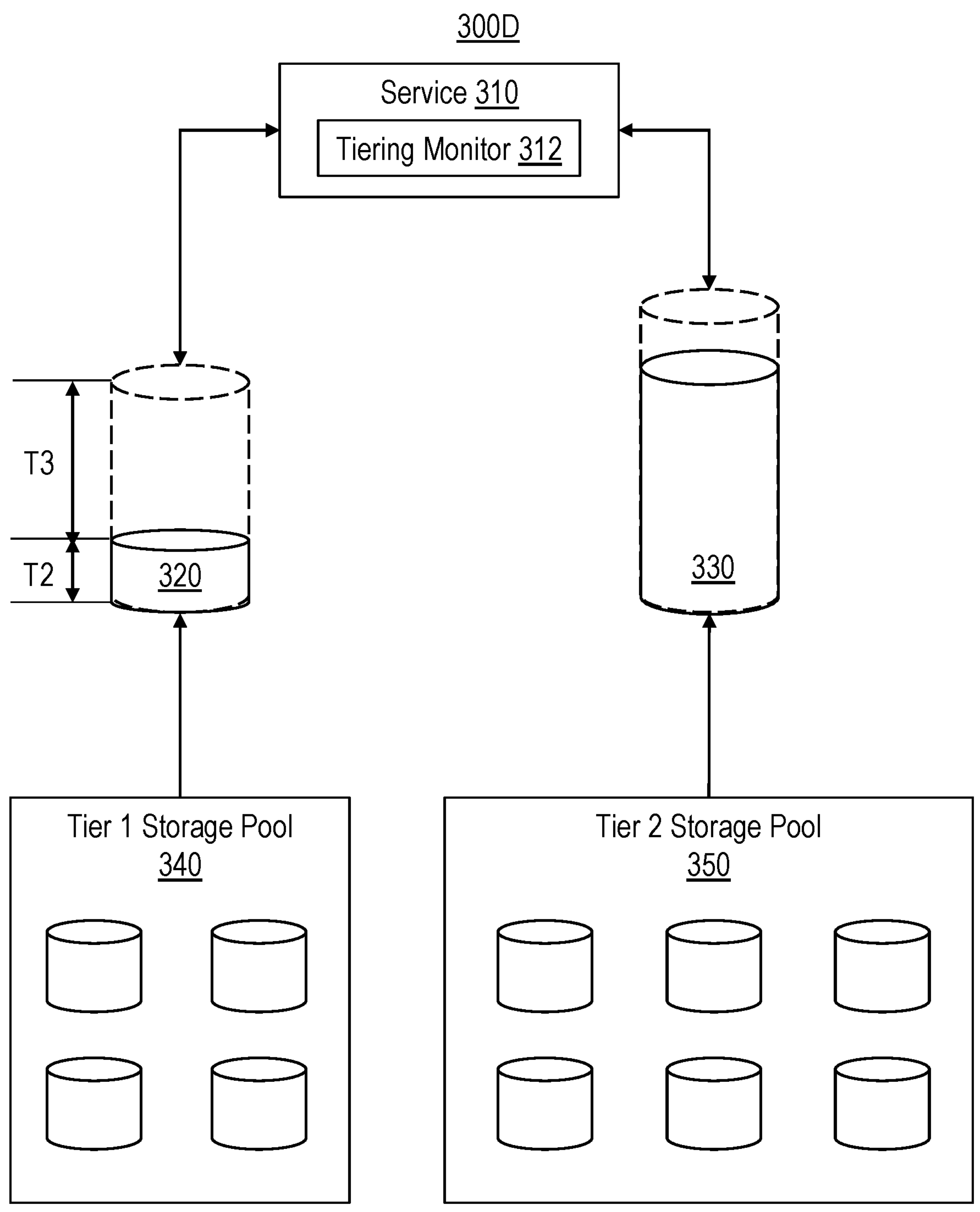

FIG. 3C is a schematic chart 300C that illustrates that in response to determining that a particular event has occurred (e.g., a first threshold T1 has been reached), the tiering monitor selects a set of data 327 stored in a portion of the first logical volume 320 and copies the selected set of data 327 to the second logical volume 330. FIG. 3D is a schematic chart 300D that illustrates that after copying the set of data 327 to the second logical volume 330, a portion of the storage in the first logical volume 320 that stores the set of data 327 is deallocated or demapped.

In some embodiments, the tiering monitor 312 is further configured to monitor the status of the second logical volume 330. For example, in some embodiments, the tiering monitor 312 is further configured to determine that the second logical volume 330 has sufficient free storage to store the set of data. In some embodiments, the second logical volume 330 also has a predetermined threshold for performing a write operation. If copying the set of data 327 causes a total amount of storage provisioned for the second logical volume 330 to reach the predetermined threshold, it is determined that the second logical volume 330 does not have sufficient free storage to store the set of data. In some embodiments, because the second logical volume 330 is thinly provisioned, in response to determining that the second logical volume has sufficient free storage to store the selected set of data 327, an additional amount of storage 332 is allocated to the second logical volume 330 for storing the set of data 327.

In some embodiments, in response to determining that the second logical volume 330 does not have sufficient free storage to store the set of data 327, one or more remedial actions can be taken. For example, in some embodiments, an alert is generated, notifying a user that the first logical volume 320 and/or the second logical volume 330 is running low. Alternatively, or in addition, a smaller set of data 327 is selected and copied to the second logical volume 330, and/or a portion of the second logical volume 330 is deallocated and/or copied to a lower-tiered volume (not shown) based on one or more tiering policy rules. The tiering policy rules are based on a plurality of parameters, such as file type, size, frequency of access, and so on. In some embodiments, when hypervisor and VMs are implemented, the tiering policy rules are set by a user of VM at each child partition 220, and/or stored at each child partition 220. Alternatively, or in addition, some or all of the tiering policy rules are set by a parent partition 210 and/or the hypervisor 230.

In some embodiments, selecting the set of data 327 is also based on the one or more tiering policy rules. For example, in some embodiments, a tiering policy rule requires inactive data stored in a higher tiered volume that has not been accessed for a predetermined period to be moved to a lower-tiered volume. As another example, in some embodiments, a policy rule requires active data stored in a lower-tiered volume to be moved to a higher-tier volume.

In some embodiments, the set of data 327 (that is selected and copied from the first logical volume 320 to the second logical volume 330) is a predetermined amount of data (e.g., 100 gigabytes, 500 gigabytes), such that in response to deallocating the portion of the first logical volume, a total amount of storage that has been provisioned for the first logical volume 320 is below a predetermined threshold (also referred to as a second threshold T2). Alternatively, the amount of the set of data 327 is determined to cause an amount of free space available for the first logical volume 320 to be greater than a predetermined threshold (also referred to as a third threshold T3). In some embodiments, the second threshold T2 or the third threshold T3 is a predetermined percentage of the first maximum capacity V1.

For example, the first maximum capacity V1 is one terabyte, the first threshold T1 is 90%, and the second threshold T2 is 50%. In response to a write operation, the first threshold T1 is reached, i.e., the total amount of the storage that has been provisioned reaches nine hundred gigabytes (=90% of one terabyte). The tiering monitor 312 then selects a set of data 327 that is about 400 gigabyte, copies the 400 gigabytes of data to the second logical volume 330, and deallocate the 400 gigabytes of storage from the first logical volume. If the second logical volume 330 does not have sufficient free storage to store the 400 gigabytes, the amount of the set of data 327 is adjusted based on the amount of free storage in the second logical volume 330. Alternatively, a portion of the second logical volume 330 is deallocated or moved to a lower-tiered volume (not shown) based on the one or more tiering policy rules, such that the second logical volume 330 has sufficient free storage to store the 400 gigabytes.

Figure 3E:
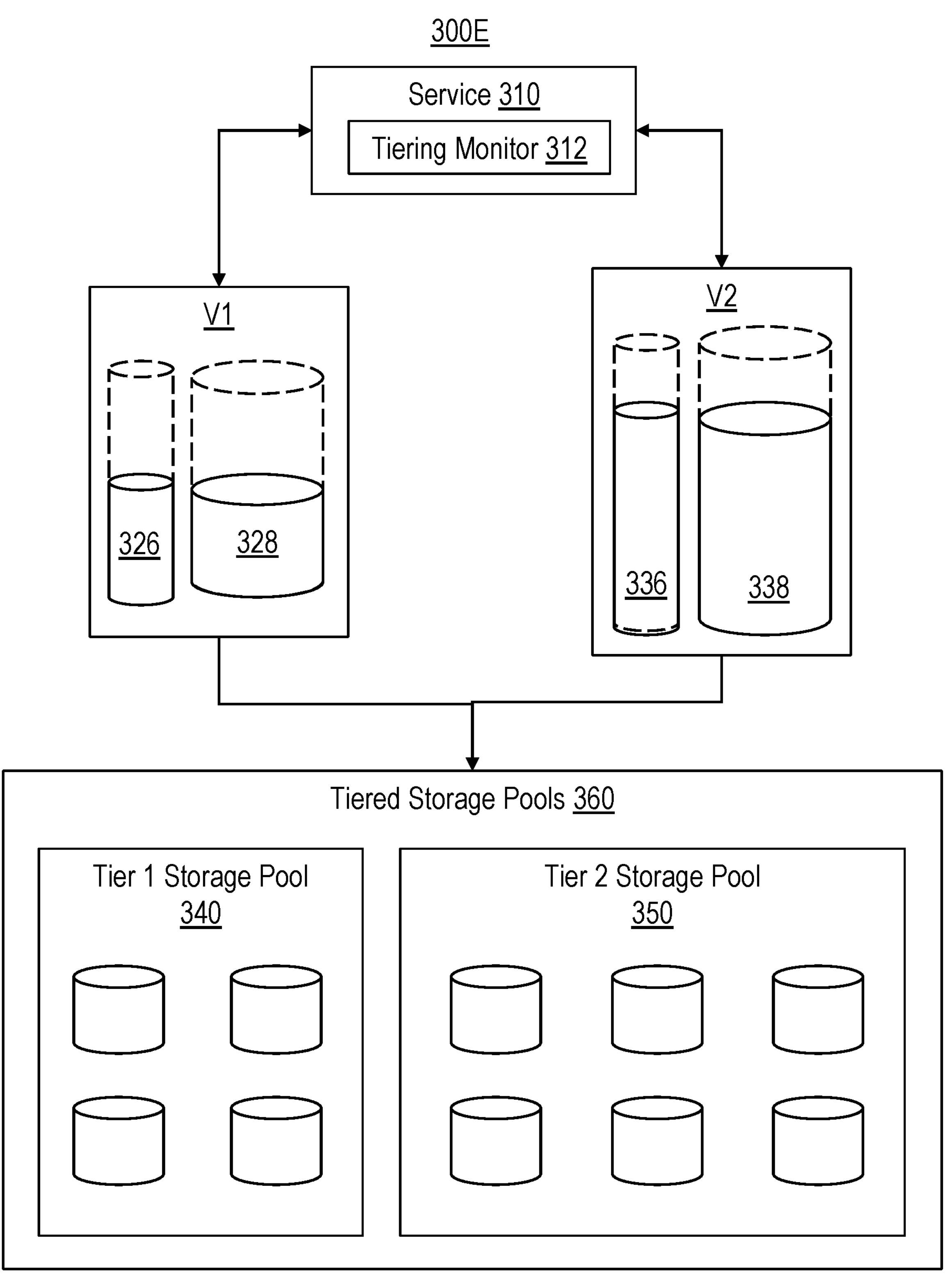

In some embodiments, each storage volume is tiered across media types, and different storage volumes are configured to store different types of data, such as local user data or cached user data. FIG. 3E illustrates an example embodiment 300E, in which each volume V1 or V2 is tiered across multiple types of storage pools 360, such as tier-one storage pool 340 and tier-two storage pool 350. In some embodiments, volumes V1 and V2 are configured to store different types of data that requires different input/output (IO) speeds and/or utilization rates. For example, volume V1 is configured to host local user data, for which fast IO is required, but it may not be fully utilized at all times. Volume V2 is configured to cache user data, and the system is configured to fill V2 as much as possible. Write operations to both volumes V1 and V2 are staged in fast media (i.e., storage 326, 336 provisioned over tier-one storage pool 340) and destaged to slow media (i.e., storage 328, 338 provisioned over tier-two storage pool 350). For example, when the fast media (i.e., storage 326) in volume V1 becomes sufficiently full, the system is configured to request volume V2 to deallocate some of its fast media (i.e., storage 336), such that the system can allocate more fast media for volume V1 to achieve a service level agreement for user IO.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 4A:
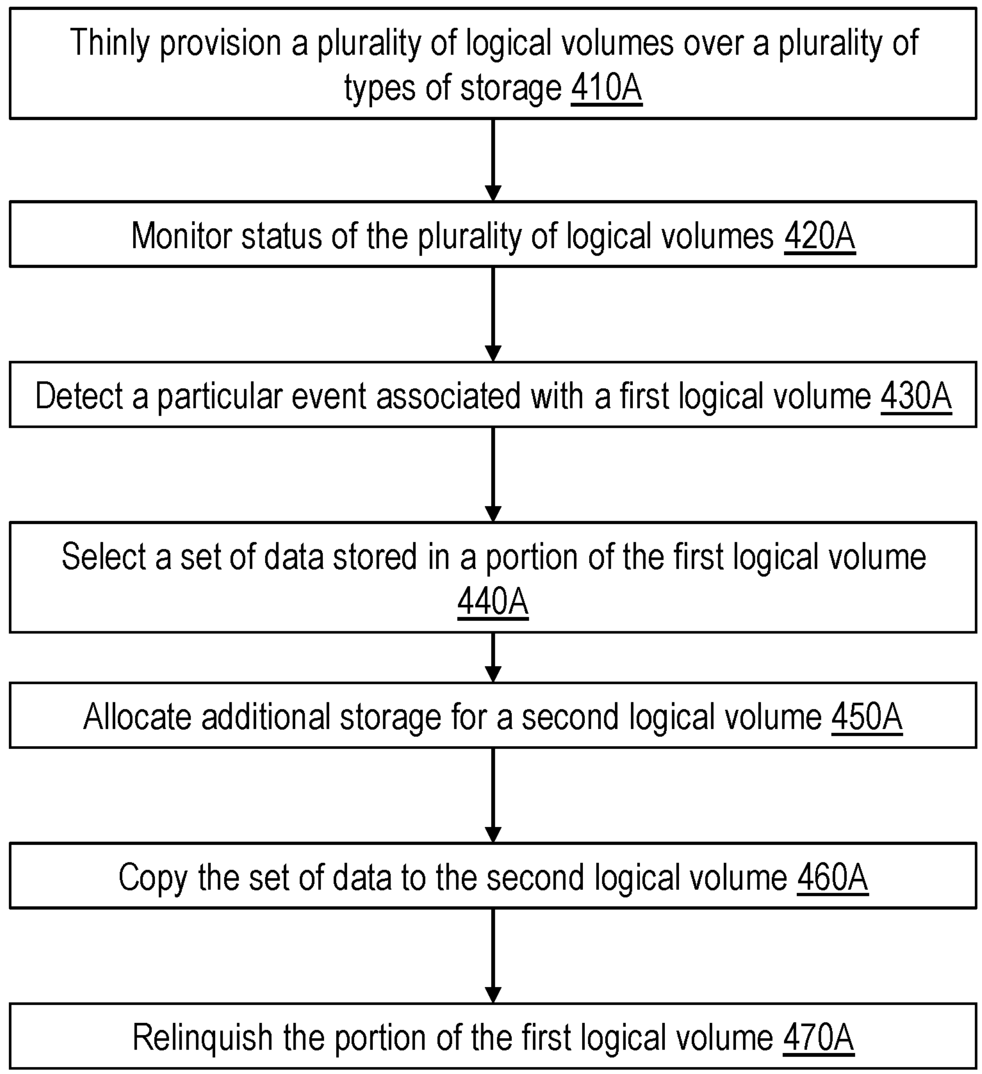
FIG. 4A illustrates a flowchart of an example method for prioritized thin provisioning with eviction overflow between tiers.

FIG. 4A illustrates a flowchart of an example method 400A for prioritized thin provisioning with eviction overflow between tiers, which is implemented at a computer system (e.g., the computer system 200 of FIG. 2). The method 400A includes thinly provisioning a plurality of logical volumes over a plurality of types of storage (act 410A). In some embodiments, the plurality of logical volumes includes (1) a first logical volume that is thinly provisioned over a first type of storage, and (2) a second logical volume that is thinly provisioned over a second type of storage. In some embodiments, the first logical volume has a first maximum capacity, and the second logical volume has a second maximum capacity.

The method 400A further includes monitoring status of the plurality of logical volumes to detect one or more events associated with at least one of the plurality of logical volumes (act 420A). In response to detecting a particular event among the one or more events (act 430A), a set of data stored in a portion of the first logical volume is selected (act 440A). For example, in some embodiments, the particular event is that a total amount of storage used for the first logical volume reaches a predetermined threshold. In some embodiments, the method 400A also includes allocating additional storage for the second logical volume (act 450A). Thereafter, the selected set of data is copied to the second logical volume (act 460A), and the portion of the first logical volume that stores the set of data is deallocated or demapped (act 470A).

In some embodiments, the first type of storage is the tier-one storage that has a first access speed, and the second type of storage is tier-two storage that has a second access speed that is slower than the first access speed. For example, in some embodiments, the plurality of tiers of storage includes at least two of (1) an HDD, (2) a lower speed SSD, (3) a higher speed SSD, and/or (4) an ultra disk. Alternatively, or in addition, in some embodiments, the plurality of tiers of storage includes at least (1) a local disk that is accessible locally, and (2) a remote disk accessible via a network. In some embodiments, the first logical volume is configured to handle write operations having a first priority, and the second logical volume is configured to handle write operations having a second priority that is lower than the first priority. For example, in some embodiments, the first logical volume is configured to store cached data, and the second logical volume is configured to store user data.

Notably, it is common that a higher-tier storage volume is used up first, and a lower-tier storage volume is underused due to various practical reasons, such as the availability of different tiered storage devices, the amount of different tiered storage volumes that have been provisioned for the client, etc. Thus, in many cases, data in the higher-tier storage volume is moved to the lower-tier storage volume. However, moving data from a higher-tier storage volume to a lower-tier storage volume is not necessary, and similar principles described herein are also applicable to moving data from a lower-tier storage volume to a higher-tier storage volume. For example, based on tiering policy rules, in some circumstances, data stored in a lower-tier storage volume can be automatically moved to a higher-tier storage volume or vice versa. The tiering policy rules can be set by users, the storage service, and/or applications that are using the tiered storage volumes.

Additionally, the similar principles described herein are also applicable to more than two-tiered systems. For example, when three volumes corresponding to three different tiered storage are thinly provisioned, a portion of any particular one of the three volumes can be evicted by copying data from the particular volume to any other volume based on tiering policy rules. For example, in some embodiments, a first volume is thinly provisioned over tier-one storage, a second volume is thinly provisioned over tier-two storage, and a third volume is thinly provisioned over tier-three storage. In some embodiments, the tier-one storage includes ultra disks, the tier-two storage includes SSDs, and the tier-three storage includes HDDs. When a total volume provisioned for the first volume reaches a predetermined threshold, a set of data stored in the first volume is selected and copied to the second volume; and when a total volume provisioned for the second volume reaches a predetermined threshold, a set of data stored in the second volume is selected and copied to the third volume.

The principles described herein can also be implemented in a system having a plurality of volumes, each of which is thinly provisioned and tiered over a plurality of types of storage. It is often that each of the plurality of volumes is configured to store a different type of data, and some of the plurality of volumes are required to have a sufficient amount of empty space to ensure high IO speed, while some of the plurality of volumes can be more efficiently used. The system is configured to dynamically allocate storage between volumes.

Figure 4B:
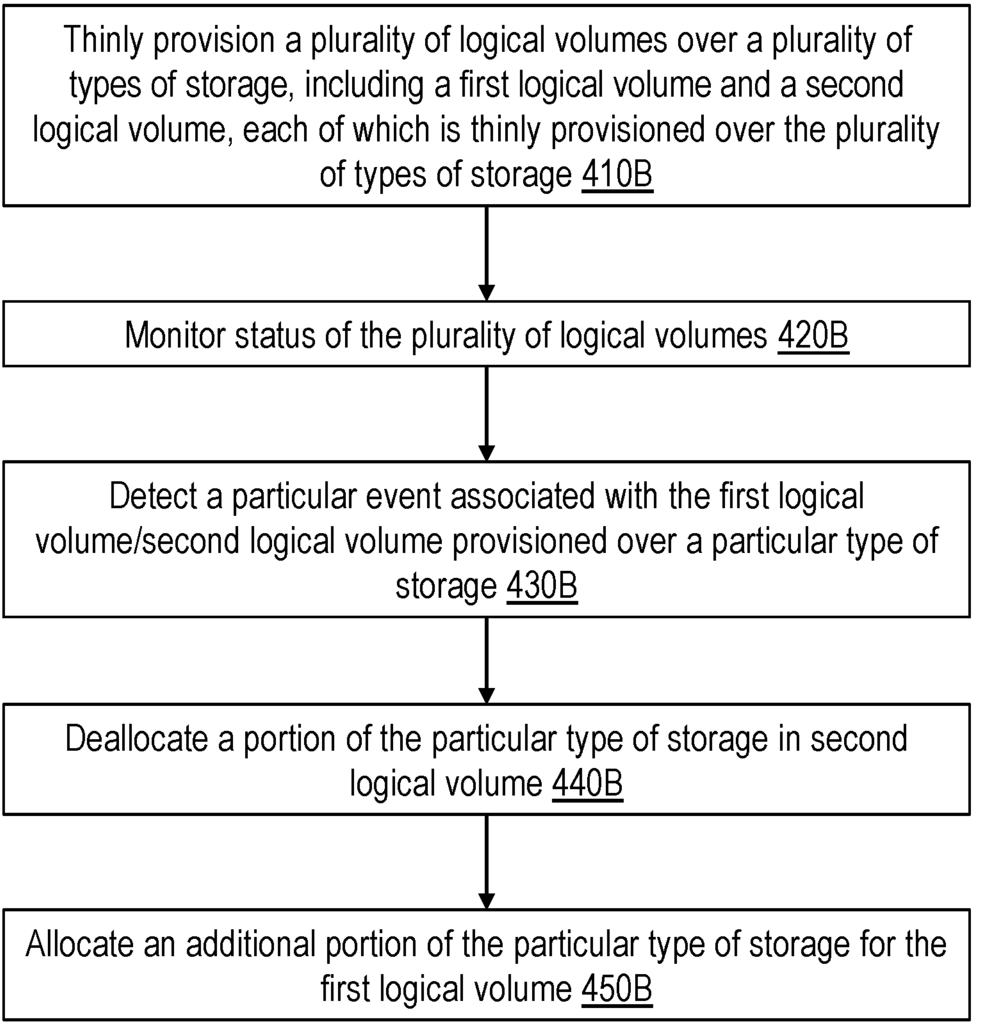
FIG. 4B illustrates a flowchart of an example method for prioritized thin provisioning with dynamic storage allocation between volumes.

FIG. 4B illustrates a flowchart of an example method 400B for prioritized thin provisioning with dynamic storage allocation between volumes, which is implemented at a computer system (e.g., the computer system 200 of FIG. 2). The method 400B includes thinly provision a plurality of logical volumes over a plurality of types of storage (act 410B). The plurality of logical volumes includes a first logical volume and a second logical volume, each of which is thinly provisioned and tiered over the plurality of type of storage. A total amount of each type of storage provisioned for the plurality of logical volumes has a maximum capacity. For example, each of the first logical volume and the second logical volume is tiered over a first type of storage and a second type of storage, as such a total amount of the first type of storage provisioned for the first logical volume and the second logical volume has a first maximum amount, and a total amount of the second type of storage provisioned for the first logical volume and the second logical volume has a second maximum amount. In some embodiments, the first logical volume and the second logical volume are both tiered across HDD and SDD, the first logical volume is configured to host local user data, for which fast IO is required, but which may not be fully utilized at all time; and the second volume is configured to cache user data, which it is desirable to fill as much as possible. Write operations to both the first logical volume and the second logical volume are staged in the first type of storage (e.g., fast media) and destaged to the second type of storage (e.g., slow media).

The method 400B further includes monitoring status of the plurality of logical volumes (act 420B) and detecting a particular event associated with the first logical volume and/or the second logical volume provisioned over a particular type of storage (act 430B). For example, in some embodiments, the particular event is related to the first logical volume provisioned over a particular type of storage being sufficiently full. In response to detecting the particular event, a portion of the particular type of storage in the second logical volume is deallocated (act 440B), and an additional portion of the particular type of storage is allocated for the first logical volume (act 450B).

Finally, because the principles described herein may be performed in the context of a computer system, some introductory discussion of a computer system will be described with respect to FIG. 5.

Computer systems are now increasingly taking a wide variety of forms. Computer systems may, for example, be hand-held devices, appliances, laptop computer systems, desktop computer systems, mainframes, distributed computer systems, data centers, or even devices that have not conventionally been considered a computer system, such as wearables (e.g., glasses). In this description and in the claims, the term "computer system" is defined broadly as including any device or system (or a combination thereof) that includes at least one physical and tangible processor, and a physical and tangible memory capable of having thereon computer system-executable instructions that may be executed by a processor. The memory may take any form and may depend on the nature and form of the computer system. A computer system may be distributed over a network environment and may include multiple constituent computer systems.

As illustrated in FIG. 5, in its most basic configuration, a computer system 500 typically includes at least one hardware processing unit 502 and memory 504. The processing unit 502 may include a general-purpose processor and may also include a field-programmable gate array (FPGA), an application-specific integrated circuit (ASIC), or any other specialized circuit. The memory 504 may be physical system memory, which may be volatile, non-volatile, or some combination of the two. The term "memory" may also be used herein to refer to non-volatile mass storage such as physical storage media. If the computer system is distributed, the processing, memory and/or storage capability may be distributed as well.

The computer system 500 also has thereon multiple structures often referred to as an "executable component". For instance, memory 504 of the computer system 500 is illustrated as including executable component 506. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computer system, whether such an executable component exists in the heap of a computer system, or whether the executable component exists on computer system-readable storage media.

In such a case, one of ordinary skill in the art will recognize that the structure of the executable component exists on a computer system-readable medium such that, when interpreted by one or more processors of a computer system (e.g., by a processor thread), the computer system is caused to perform a function. Such a structure may be computer system-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hardcoded or hard-wired logic gates, that are implemented exclusively or near-exclusively in hardware, such as within a field-programmable gate array (FPGA), an application-specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description above, embodiments are described with reference to acts that are performed by one or more computer systems. If such acts are implemented in software, one or more processors (of the associated computer system that performs the act) direct the operation of the computer system in response to having executed computer system-executable instructions that constitute an executable component. For example, such computer system-executable instructions may be embodied in one or more computer system-readable media that form a computer system program product. An example of such an operation involves the manipulation of data. If such acts are implemented exclusively or near-exclusively in hardware, such as within an FPGA or an ASIC, the computer system-executable instructions may be hardcoded or hard-wired logic gates. The computer system-executable instructions (and the manipulated data) may be stored in the memory 504 of the computer system 500. Computer system 500 may also contain communication channels 508 that allow the computer system 500 to communicate with other computer systems over, for example, network 510.

While not all computer systems require a user interface, in some embodiments, the computer system 500 includes a user interface system 512 for use in interfacing with a user. The user interface system 512 may include output mechanisms 512A as well as input mechanisms 512B. The principles described herein are not limited to the precise output mechanisms 512A or input mechanisms 512B as such will depend on the nature of the device. However, output mechanisms 512A might include, for instance, speakers, displays, tactile output, holograms, and so forth. Examples of input mechanisms 512B might include, for instance, microphones, touchscreens, holograms, cameras, keyboards, mouse or other pointer input, sensors of any type, and so forth.

Embodiments described herein may comprise or utilize a special purpose or general-purpose computer system, including computer system hardware, such as, for example, one or more processors and system memory, as discussed in greater detail above. Embodiments described herein also include physical and other computer system-readable media for carrying or storing computer system-executable instructions and/or data structures. Such computer system-readable media can be any available media that can be accessed by a general-purpose or special-purpose computer system. Computer system-readable media that store computer system-executable instructions are physical storage media. Computer system-readable media that carry computer system-executable instructions are transmission media. Thus, by way of example, and not limitation, embodiments of the invention can comprise at least two distinctly different kinds of computer system-readable media: storage media and transmission media.

Computer system-readable storage media includes RAM, ROM, EEPROM, CD-ROM, or other optical disk storage, magnetic disk storage, or other magnetic storage devices, or any other physical and tangible storage medium or hardware storage devices which can be used to store desired program code means in the form of computer system-executable instructions or data structures and which can be accessed by a general-purpose or special-purpose computer system.

A "network" is defined as one or more data links that enable the transport of electronic data between computer systems and/or modules and/or other electronic devices. When information is transferred or provided over a network or another communications connection (either hard-wired, wireless, or a combination of hard-wired or wireless) to a computer system, the computer system properly views the connection as a transmission medium. Transmissions media can include a network and/or data links that can be used to carry desired program code means in the form of computer system-executable instructions or data structures and which can be accessed by a general-purpose or special-purpose computer system. Combinations of the above should also be included within the scope of computer-readable media.

Further, upon reaching various computer system components, program code means in the form of computer system-executable instructions or data structures can be transferred automatically from transmission media to storage media (or vice versa). For example, computer system-executable instructions or data structures received over a network or data link can be buffered in RAM within a network interface module (e.g., a "NIC"), and then eventually transferred to computer system RAM and/or to less volatile storage media at a computer system. Thus, it should be understood that storage media can be included in computer system components that also (or even primarily) utilize transmission media.

Computer system-executable instructions comprise, for example, instructions and data which, when executed at a processor, cause a general-purpose computer system, special purpose computer system, or special purpose processing device to perform a certain function or group of functions. Alternatively or in addition, the computer system-executable instructions may configure the computer system to perform a certain function or group of functions. The computer system-executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computer systems, desktop computer systems, laptop computer systems, message processors, hand-held devices, multi-processor systems, microprocessor-based or programmable consumer electronics, network PCs, minicomputer systems, mainframe computer systems, mobile telephones, PDAs, pagers, routers, switches, data centers, wearables (such as glasses) and the like. The invention may also be practiced in distributed system environments where local and remote computer systems, which are linked (either by hard-wired data links, wireless data links, or by a combination of hard-wired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

FIGS. 1-2 and 3A-3D discussed various computer systems which correspond to the computer system 500 described herein. The computer systems of the remaining figures include various components or functional blocks that may implement the various embodiments disclosed herein, as will be explained. The various components or functional blocks may be implemented on a local computer system or may be implemented on a distributed computer system that includes elements resident in the cloud or that implement aspect of cloud computing. The various components or functional blocks may be implemented as software, hardware, or a combination of software and hardware. The computer systems of FIGS. 1-2 and 3A-3D may include more or less than the components illustrated in FIG. 5, and some of the components may be combined as circumstances warrant. Although not necessarily illustrated, the various components of the computer systems may access and/or utilize a processor and memory, such as processing unit 502 and memory 504, as needed to perform their various functions.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system comprising:

one or more processors; and one or more computer system-readable hardware storage devices having stored thereon computer system-executable instructions that are structured such that when the computer system-executable instructions are executed by the one or more processors, the computer system is configured to perform at least:

thinly provision and tier a plurality of logical volumes over a plurality of types of storage, including thinly provisioning and tiering each of a first logical volume and a second logical volume over the plurality of types of storage;

monitor status of the plurality of logical volumes to detect one or more events associated with at least one of the plurality of logical volumes;

in response to detecting a first event:

select a set of data stored in a portion of the first logical volume;

copy the set of data to the second logical volume; and deallocate the portion of the first logical volume that stores the set of data; and in response to detecting a second event:

select a portion of the second logical volume that is thinly provisioned over a particular type of storage;

deallocate a first portion of the particular type of storage that corresponds to the portion of the second logical volume; and allocate a second portion of the particular type of storage to the first logical volume.

2. The computer system of claim 1, wherein the plurality of types of storage includes at least two of (1) a hard disk drive, (2) a lower-speed solid state drive (SSD), (3) a higher-speed SSD, and (4) an ultra disk.

3. The computer system of claim 1, wherein the plurality of types of storage includes at least (1) a local disk that is accessible locally, and (2) a remote disk accessible via a network.

4. The computer system of claim 1, wherein the first logical volume is configured to store cached data, and the second logical volume is configured to store user data.

5. The computer system of claim 1, wherein selecting the set of data is based on one or more tiering policy rules.

6. The computer system of claim 1, wherein the first event is a map failure, indicating that there is not enough storage for a write operation.

7. The computer system of claim 1, wherein:

the plurality of logical volumes includes (1) the first logical volume that is thinly provisioned over a first type of storage among the plurality of types of storage, and (2) the second logical volume that is thinly provisioned over a second type of storage among the plurality of types of storage, the first logical volume having a first capacity, and the second logical volume having a second capacity.

8. The computer system of claim 7, wherein the first type of storage is tier-one storage that has a first access speed, and the second type of storage is tier-two storage that has a second access speed that is slower than the first access speed.

9. The computer system of claim 7, wherein the first event is associated with a write operation that writes data to the first logical volume, and wherein the computer system is configured to, in response to the write operation:

determine whether a total amount of storage that has been provisioned for the first logical volume is greater than a predetermined threshold, and when the total amount of storage that has been provisioned for the first logical volume is greater than the predetermined threshold, determine that the first event occurs.

10. The computer system of claim 9, wherein the predetermined threshold is associated with the first capacity.

11. The computer system of claim 1, wherein the set of data is a predetermined amount of data, such that in response to deallocating the portion of the first logical volume, a total amount of storage that has been provisioned for the first logical volume is below a predetermined threshold.

12. The computer system of claim 11, wherein an amount of the set of data is determined based on the predetermined threshold or an amount of free storage in the second logical volume.

13. The computer system of claim 1, wherein the second event is associated with a total amount of the particular type of storage used by the first logical volume.

14. A method implemented at a computer system for prioritized thin provisioning with eviction overflow between tiers, the method comprising:

thinly provisioning and tiering a plurality of logical volumes over a plurality of types of storage, including thinly provisioning and tiering each of a first logical volume and a second logical volume over the plurality of types of storage;

monitoring status of the plurality of logical volumes to detect one or more events associated with at least one of the plurality of logical volumes;

in response to detecting a first event:

selecting a set of data stored in a portion of the first logical volume;

copying the set of data to the second logical volume; and deallocating the portion of the first logical volume that stores the set of data; and in response to detecting a second event:

selecting a portion of the second logical volume that is thinly provisioned over a particular type of storage;

deallocating a first portion of the particular type of storage that corresponds to the portion of the second logical volume; and allocating a second portion of the particular type of storage to the first logical volume.

15. The method of claim 14, wherein the plurality of types of storage includes at least (1) a local disk that is accessible locally, and (2) a remote disk accessible via a network.

16. The method of claim 14, wherein the first logical volume is configured to store cached data, and the second logical volume is configured to store user data.

17. The method of claim 14, wherein selecting the set of data is based on one or more tiering policy rules.

18. The method of claim 14, wherein the plurality of logical volumes includes (1) the first logical volume that is thinly provisioned over a first type of storage among the plurality of types of storage, and (2) the second logical volume that is thinly provisioned over a second type of storage among the plurality of types of storage, the first logical volume having a first capacity, and the second logical volume having a second capacity.

19. A computer system-readable hardware storage device having stored thereon computer system-executable instructions that are structured such that when the computer system-executable instructions are executed by a processor, a computer system is configured to perform at least:

thinly provision and tier a plurality of logical volumes over a plurality of types of storage, including thinly provisioning and tiering each of a first logical volume and a second logical volume over the plurality of types of storage;

monitor status of the plurality of logical volumes to detect one or more events associated with at least one of the plurality of logical volumes;

in response to detecting a first event:

select a set of data stored in a portion of the first logical volume;

copy the set of data to the second logical volume; and deallocate the portion of the first logical volume that stores the set of data; and in response to detecting a second event:

select a portion of the second logical volume that is thinly provisioned over a particular type of storage;

deallocate a first portion of the particular type of storage that corresponds to the portion of the second logical volume; and allocate a second portion of the particular type of storage to the first logical volume.

20. The method of claim 14, wherein the plurality of types of storage includes at least (1) a local disk that is accessible locally, and (2) a remote disk accessible via a network.

* * * * *